April 27, 1926.                                            1,582,431
              L. REISCHL
    KEY MECHANISM FOR TYPEWRITING MACHINES
         Filed April 20, 1923       2 Sheets-Sheet 1
Fig. 1.
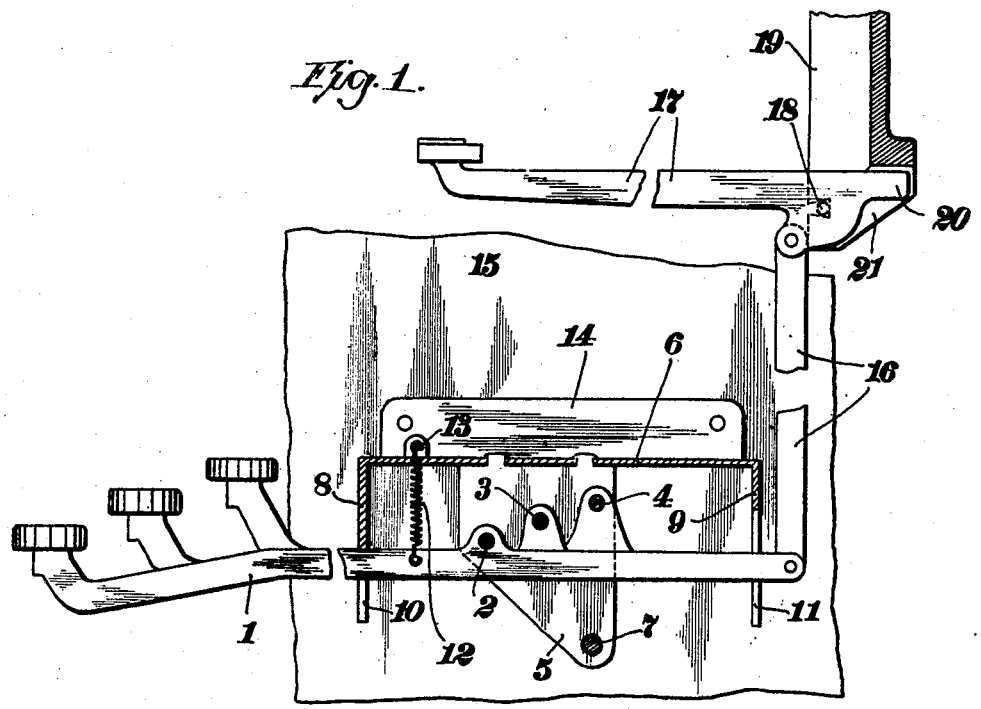
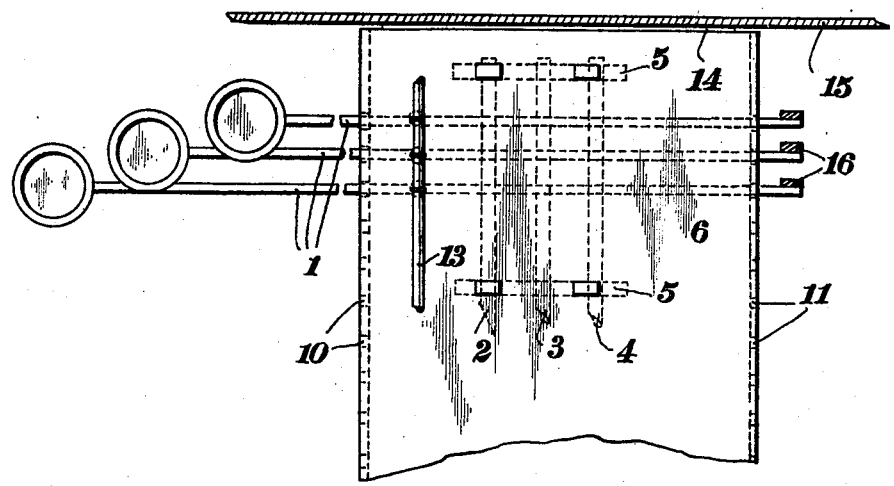
Fig. 2

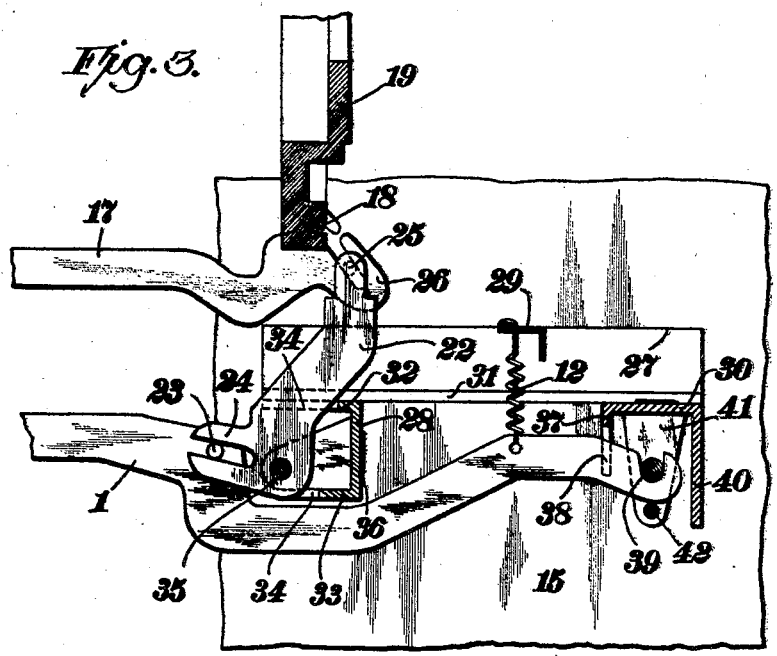

Patented Apr. 27, 1926.

1,582,431

UNITED STATES PATENT OFFICE.

LUDWIG REISCHL, OF NUREMBERG, GERMANY, ASSIGNOR TO BING-WERKE, VORM. GEBR. BING A.-G., OF NUREMBERG, GERMANY.

KEY MECHANISM FOR TYPEWRITING MACHINES.

Application filed April 20, 1923. Serial No. 633,499.

*To all whom it may concern:*

Be it known that I, LUDWIG REISCHL, a citizen of the German Reich, residing at Nuremberg, Germany, have invented certain new and useful Improvements in Key Mechanism for Typewriting Machines (for which an application for patent has been filed in Germany on the 1st of September, 1922, and 5th of February, 1923), of which the following is a specification.

It has become known to use for the guiding of key- and intermediate levers in typewriting machines U-shaped members bent from sheet iron which have slits. The key levers are mounted on an axle which extends between the arms of the U-shaped member. According to this invention this axle is mounted in several bearing plates or cheeks which are fixed at convenient distances apart on the web of the U-shaped member in order to avoid vibrations of the axle as much as possible. The U-shaped member is further made so large that the widely spaced arms form perfect guides for the key levers.

The U-shaped member for the mounting of the key levers and of the key mechanism frames can be manufactured by unskilled workmen so that they can be easily inserted as a finished whole between the side walls of the frame of the typewriting machine.

In the drawings one form of construction for a key lever support is shown by way of example.

Figs. 1 and 2 show respectively in cross section and plan view one embodiment of the invention.

In the embodiment of the invention shown in Fig. 1 and 2 the key levers 1 of the lower group of keys are pivotally mounted on an axle 2, those of the middle group of keys on an axle 3 and those of the third group of keys on an axle 4. The axles 2, 3 and 4 are fixed in bearing cheeks 5 riveted on the web plate of a sheet metal member 6 of U-shaped cross section. In the bearing cheeks 5 an axle 7 is further fixed which is designed for the mounting of the shifting, spacing- and like key levers. The two arms 8 and 9 of the U-shaped sheet metal member 6 have guiding slits 10, 11 respectively for the key levers 1, said slits standing exactly opposite one another. Each key lever is controlled by a spring 12 which holds the key lever in the normal position. The lower ends of the springs 12 are attached to the key levers 1 and the upper ends are hooked on a rod 13 extending above the web plate of the sheet metal member 6. By means of two lateral flanges 14 the entire key board mechanism is connected with the side walls 15 of the frame of the typewriting machine. The pusher rods 16 for the type levers 17 are hingedly connected with the rear ends of the key levers 1 said type levers being mounted on the curved axle 18 of a type lever segment 19 and guided by means of a rearwardly directed extension 20 in slits 21 of the segment 19. The ratios of transmission of the key levers are selected so that the stroke of the key is approximately the same for each group of keys.

This mounting and guiding of the key- and intermediate levers in U-shaped sheet metal members is specially adapted, as all the parts are made by stamping, for cheap but accurate manufacture on a large scale particularly as no milling work is required and as the parts can be put together by unskilled workmen.

I claim:—

A key lever support for typewriting machines comprising only one single sheet metal member of U-shaped cross section, the two arms of which are spaced widely and have longitudinal slits for guiding the key levers, and bearing cheeks for the axle of the key levers on the web plate of said U-shaped member, said bearing cheeks fixed at convenient distances apart between the arms of the U-shaped member.

In testimony whereof I affix my signature.

LUDWIG REISCHL.